(12) United States Patent
Hwang

(10) Patent No.: US 11,295,558 B2
(45) Date of Patent: Apr. 5, 2022

(54) DEVICE AND METHOD FOR VERIFYING VEHICLE-SCRAPPING INFORMATION

(71) Applicants: HYUNDAI MOTOR COMPANY, Seoul (KR); Kia Motors Corporation, Seoul (KR)

(72) Inventor: Chang-Sik Hwang, Seoul (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 227 days.

(21) Appl. No.: 16/206,571

(22) Filed: Nov. 30, 2018

(65) Prior Publication Data
US 2019/0295332 A1 Sep. 26, 2019

(30) Foreign Application Priority Data

Mar. 21, 2018 (KR) .......................... 10-2018-0032712

(51) Int. Cl.
*G07C 5/00* (2006.01)
*B60R 21/01* (2006.01)
*G07C 5/08* (2006.01)

(52) U.S. Cl.
CPC .............. *G07C 5/008* (2013.01); *B60R 21/01* (2013.01); *G07C 5/0808* (2013.01); *B60R 2021/01211* (2013.01)

(58) Field of Classification Search
CPC ...... G07C 5/008; G07C 5/0808; B60R 21/01; B60R 2021/01211
See application file for complete search history.

(56) References Cited

U.S. PATENT DOCUMENTS

| | | | | |
|---|---|---|---|---|
| 10,086,782 | B1* | 10/2018 | Konrardy | G05D 1/0212 |
| 10,160,417 | B2* | 12/2018 | Malapati | B60R 21/264 |
| 10,217,299 | B2* | 2/2019 | Nakai | G05D 1/0022 |
| 10,839,623 | B2* | 11/2020 | Mizuno | B60C 23/02 |
| 2011/0096912 | A1* | 4/2011 | Stahlin | G08B 25/016 |
| | | | | 379/39 |
| 2014/0347100 | A1* | 11/2014 | Seveau | G01R 19/0038 |
| | | | | 327/63 |
| 2016/0336815 | A1* | 11/2016 | Alperin | H02J 50/80 |
| 2017/0132640 | A1* | 5/2017 | Herman | G06Q 30/018 |
| 2019/0021125 | A1* | 1/2019 | Bischinger | H04W 48/18 |

FOREIGN PATENT DOCUMENTS

KR 10-2007-0117068 12/2007
KR 10-2016-0043321 4/2016

* cited by examiner

*Primary Examiner* — Thomas Ingram
*Assistant Examiner* — Omar K Morsy
(74) *Attorney, Agent, or Firm* — Mintz Levin Cohn Ferris Glovsky and Popeo, P.C.; Peter F. Coriess

(57) ABSTRACT

A device for verifying vehicle-scrapping information may include a communication terminal configured to receive scrapping instruction from a diagnostor to enter a scrapping mode, and transmit end-of-use information according to the scrapping instruction to a management server, and an airbag controller configured to receive the scrapping instruction from the diagnostor and transmit an airbag deployment signal to the communication terminal, wherein the communication terminal ignores all interrupt signals when entering the scrapping mode.

12 Claims, 4 Drawing Sheets

DEVICE AND METHOD FOR VERIFYING VEHICLE-SCRAPPING INFORMATION

CROSS-REFERENCE TO RELATED APPLICATION

The present application claims priority to and the benefit of Korean Patent Application No. 10-2018-0032712, filed on Mar. 21, 2018, which is incorporated herein by reference in its entirety.

FIELD

The present disclosure relates to a technique for verifying vehicle-scrapping information, and more particularly, to a device and method for verifying vehicle-scrapping information, which terminate safely an emergency call (eCall) system at the time of scrapping a vehicle and transmit end-of-use information of a communication terminal for the corresponding eCall to an operator.

BACKGROUND

The statements in this section merely provide background information related to the present disclosure and may not constitute prior art.

In general, an emergency call (eCall) system has been obligatorily applied to vehicles from the time of manufacture. Currently, both Russia and Europe have demanded that an eCall service should be provided for vehicles until a vehicle is scrapped.

An embedded subscriber identity module (eSIM) is mounted in a communication terminal for the eCall. In Europe in which the eCall has been already opened, however, if the vehicle-scrapping information of a vehicle is not provided, the eCall will be maintained in the opened state forever.

Therefore, revocation of the eCall has a problem in that a vehicle manufacturer should notify every integrated circuit card identifier (ICCID) of the relevant eCall to a communication company and the communication company should cancel the corresponding eCall by a computer system.

This may cause problems for uncancelled communication terminals in the future. In addition, it is also possible that a malfunction in the eCall occurs during a process for scrapping a vehicle.

SUMMARY

The present disclosure provides a device and method for verifying vehicle-scrapping information, which terminate safely an emergency call (eCall) system at the time of scrapping a vehicle and transmit end-of-use information of a communication terminal for the corresponding eCall to an operator.

In addition, another aspect of the present disclosure is to provide a device and method for verifying vehicle-scrapping information, which prevent relevant information from being erroneously notified to an operation center when an airbag system is scrapped.

In order to address the aspects mentioned above, the present disclosure provides a device for verifying vehicle-scrapping information, which terminates safely the eCall system at the time of scrapping a vehicle and transmits end-of-use information of a communication terminal for the corresponding eCall to an operator.

The device for verifying vehicle-scrapping information may include a communication terminal configured to receive scrapping instruction from a diagnostor to enter a scrapping mode, and transmit end-of-use information according to the scrapping instruction to a management server; and an airbag controller configured to receive the scrapping instruction from the diagnostor and transmit an airbag deployment signal to the communication terminal.

At this time, the communication terminal may ignore all interrupt signals when entering the scrapping mode.

In addition, transmission of the end-of use information may be performed according to a call scenario between the communication terminal and the management server.

Also, the call scenario may be comprised of a call attempt and a call connection between the communication terminal and the management server, and a call may be automatically terminated when a certain time is elapsed.

Furthermore, the communication terminal may be switched to a communication off mode when the call scenario is terminated.

In addition, the end-of-use information may be transmitted in a state of being included in a minimum set of data (MSD) massage.

Also, the end-of-use information may be defined as "1" when there is the scrapping instruction in an additional region of the MSD message, and may be defined as "0" when there is no scrapping instruction in the additional region of the MSD message.

In addition, the airbag controller may record relevant items as diagnostic trouble codes (DTC) after generating the airbag deployment signal.

Furthermore, the diagnostor may be connected to the airbag controller via a wired communication or a wireless communication.

Also, the management server may have call information which is predesignated to allow the management server to be connected to the communication terminal.

In addition, the communication terminal may have an embedded subscriber identity module (eSIM) mounted therein.

On the other hand, one form of the present disclosure may provide a method for verifying vehicle-scrapping information: including receiving scrapping instruction from a dignostor and entering a scraping mode, by a communication terminal; transmitting end-of-use information according to the scrapping instruction to a management server, by a communication terminal; receiving the scrapping instruction from the diagnostor by an airbag controller and transmitting an airbag deployment signal to the communication terminal; and ignoring all interrupt signals, by the communication terminal, upon entering the scrapping mode.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
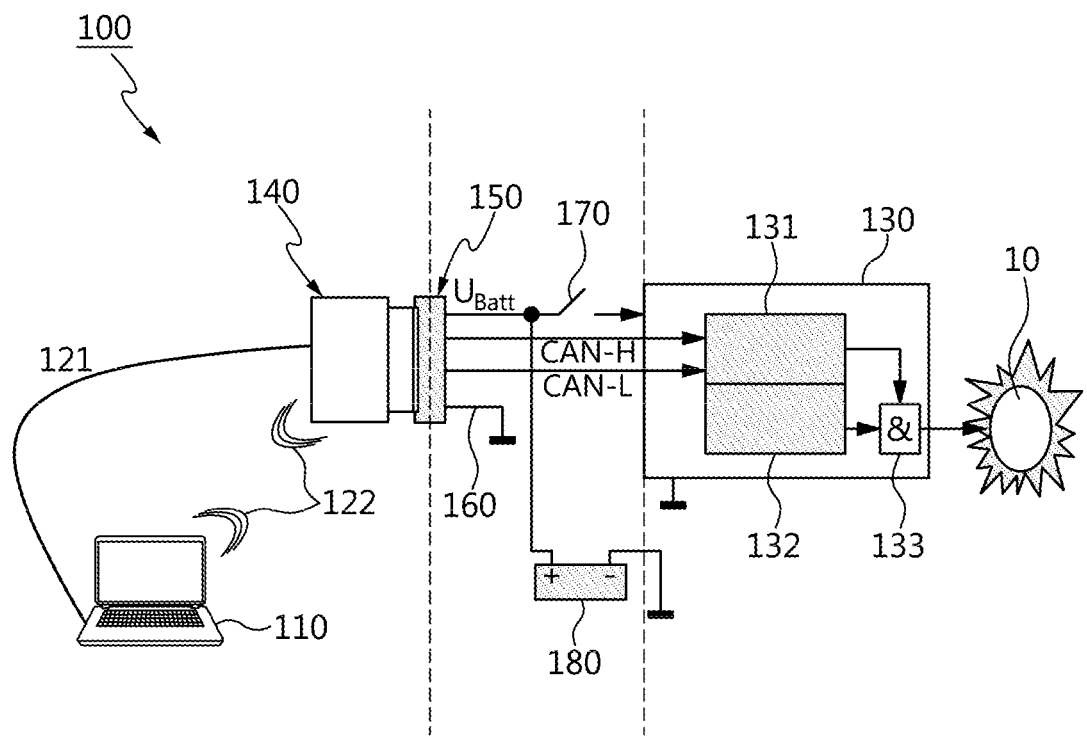
FIG. 1 is a conceptual view of a device for verifying vehicle-scrapping information in one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

While the present disclosure is susceptible to various modifications and may have a variety of forms, specific forms thereof will be illustrated by way of example in the drawings and described in detail in the detail description. It is to be understood, however, that the present disclosure is not intended to be limited to the particular forms, but includes all modifications, equivalents, and alternatives falling within the spirit and scope of the present disclosure.

Similar reference numerals are used to indicate similar components in describing each drawing. The terms "first", "second", etc. may be used to describe various components, but the components should not be limited by those terms. The above terms are used merely for the purpose to distinguish a component from the other component.

For example, a first component may be named a second component, and similarly, a second component may be named a first component without departing from the scope of right of the disclosure. The term "and/or" includes a combination of a plurality of associated listed items or any one of a plurality of associated listed items.

Unless otherwise defined, all terms used herein, including technical or scientific terms, have the same meaning as those commonly understood by one of ordinary skill in the art to which the present disclosure pertains.

Terms such as those defined in commonly used dictionaries should be interpreted as having a meaning consistent with the meaning in the context of the relevant art and, unless expressly defined in the present application, should not be interpreted as an ideal or overly formal sense.

Hereinafter, a device and method for verifying vehicle-scrapping information in some forms of the present disclosure will be described in detail with reference to the accompanying drawings.

FIG. 1 is a conceptual view of a device for verifying vehicle-scrapping information in some forms of the present disclosure. Referring to FIG. 1, a device 100 for verifying vehicle-scrapping information may include a diagnostor 110, an airbag controller 130 controlling an airbag 10, a communication interface 140 connecting the diagnostor 110 to the airbag controller 130, a connection connector 150 connected to the communication interface 140, a battery 180 supplying power to the airbag controller 130, and the like.

The diagnostor 110 diagnoses the airbag controller 130 and performs instruction transmission to the airbag controller. The diagnostor 110 has the communication interface 140 for connecting the diagnostor to the connection connector 150 installed at the airbag controller 130 side. The communication interface 140 is connected to the diagnostor 110 via a wired communication 121 or a wireless communication 122. To this end, the communication interface 140 includes a communication circuit, a terminal, and the like. The wired communication 121 may be an RS232, an RS485, a mode bus, a CC-Link communication, an Ethernet communication or the like, and the wireless communication 122 may be an infrared data (IrDA) communication, a wireless local area network (LAN), a Bluetooth, a light fidelity (LiFi), a wireless fidelity (WiFi), a near field communication (NFC) or the like.

The connection connector 150 is provided with several lines, some of which are connected to the airbag controller 130 to transmit CAN-H and CAN-L signals. In addition, the connection connector 150 is provided with a ground wire 160 for grounding and a battery connecting line connected to the battery 180. The battery connecting line is connected to a switch 170, and the switch 170 transmits or cuts off the power from the battery 180 to the airbag controller 130. A semiconductor switching device such as a power relay, a field effect transistor (FET), a metal oxide semiconductor FET (MOSFET), an insulated gate bipolar mode transistor (IGBT), a power rectifier diode and the like, a thyristor, a gate turn-off (GTO) thyristor, a triode for alternating current (TRIAC), a silicon controlled rectifier (SCR), an integrated circuit (I.C.), and the like may be employed as the switch 170.

The airbag controller 130 may include a microprocessor 131, a safety unit 132, a driving circuit 133 for driving the airbag 10 using a signal from the microprocessor 131 and a signal from the safety unit 132, and the like.

The safety unit 132 performs the function of deploying or not deploying the airbag 10. To this end, the safety unit 132 may include a collision detecting sensor (acceleration sensor) calculating a collision state, that is, an acceleration/deceleration value to monitor whether a collision has occurred, a safety sensor which is mechanically operated in the event of a collision, and the like. One side of the safety sensor is connected to a power source and the other side is connected to an airbag module, and thus when the collision occurs during a vehicle is traveled, a magnet mounted in the sensor overcomes a spring force due to inertia and is then moved in a traveling direction of the vehicle to turn on a lead switch. As a result, the power required for deploying the airbag is transmitted to the airbag 10 through the safety unit 132 and the driving circuit 133.

The battery 180 performs the function of supplying the power to the airbag 10 through the switch 170. The battery 180 is configured by disposing battery cells (not shown) in series and/or in parallel, and a high voltage battery cell used for an electric vehicle, such as a nickel metal battery cell, a lithium ion battery cell, a lithium polymer battery cell, an all solid-state battery cell and the like may be employed as the above battery cell. Generally, a high-voltage battery is a battery used as a power source for moving an electric vehicle and refers to a battery generating a high voltage of 100 V or more. However, the battery is not limited to the high-voltage battery, and a low-voltage-battery may be also employed as the battery.

Of course, although a configuration in which the battery 180 is provided in a vehicle is described in some forms of the present disclosure, it is also possible to use a separate battery.

Figure 2:
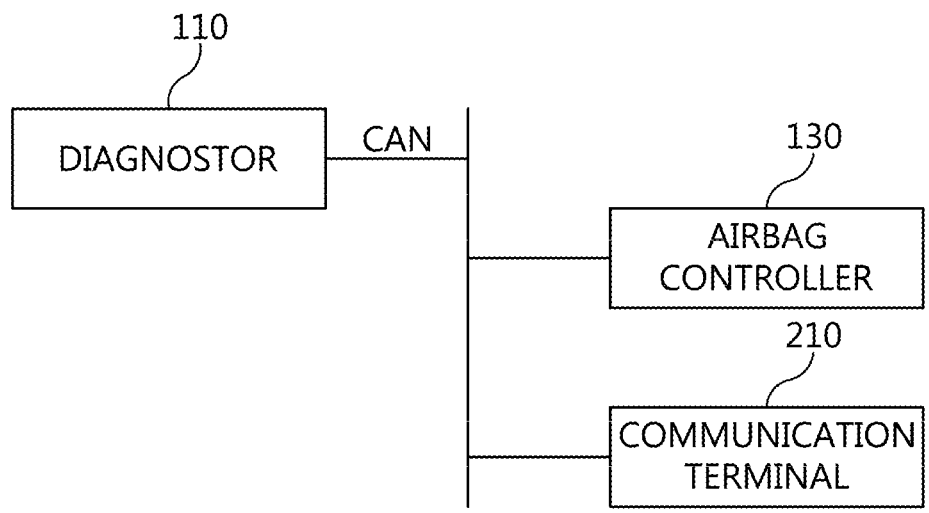
FIG. 2 is a connection conceptual view of a diagnostor, an airbag controller and a communication terminal for an emergency call, which are illustrated in FIG. 1.

FIG. 2 is a connection conceptual diagram of the diagnostor, the airbag controller, and the communication terminal for an eCall, which are shown in FIG. 1. Referring to FIG. 2, the diagnostor 110, the airbag controller 130 and a communication terminal 210 for the eCall are connected to each other via a controller area network (CAN) communication which is a wired communication. Apart from the CAN communication, of course, the above-mentioned components may be connected to each other via a multimedia-controller area network (MM-CAN), a body-controller area network (B-CAN), a high-speed controller area network, a communication line (for example, 500 kbps), a controller area network-flexible data rate (CAN-FD) communication line, a flexlay communication line, a local interconnect network (LIN) communication line, a power line communication (PLC) communication line, a control pilot (CP) communication line, and the like to send and receive the information thereamong and allow a superordinate controller to transmit the instruction to a subordinate controller.

Meanwhile, the communication terminal 210 receives scrapping instruction from the diagnostor 110 and then enters a scrapping mode, and performs the functions of transmitting end-of-use information according to the scrapping instruction to a management server (not shown). In the communication terminal 210, an embedded subscriber identity module (eSIM) is mounted.

In particular, the airbag controller 130 receives the scrapping instruction from the diagnostor 110 and then transmits an airbag deployment signal for the airbag 10 to the communication terminal 210. In addition, after a deployment of the airbag 10, the airbag controller records relevant items as diagnostic trouble codes (DTC). Although a separate memory may be configured for recording the items, the above items may be recorded in a memory configured in the microprocessor (131 in FIG. 1).

Figure 3:
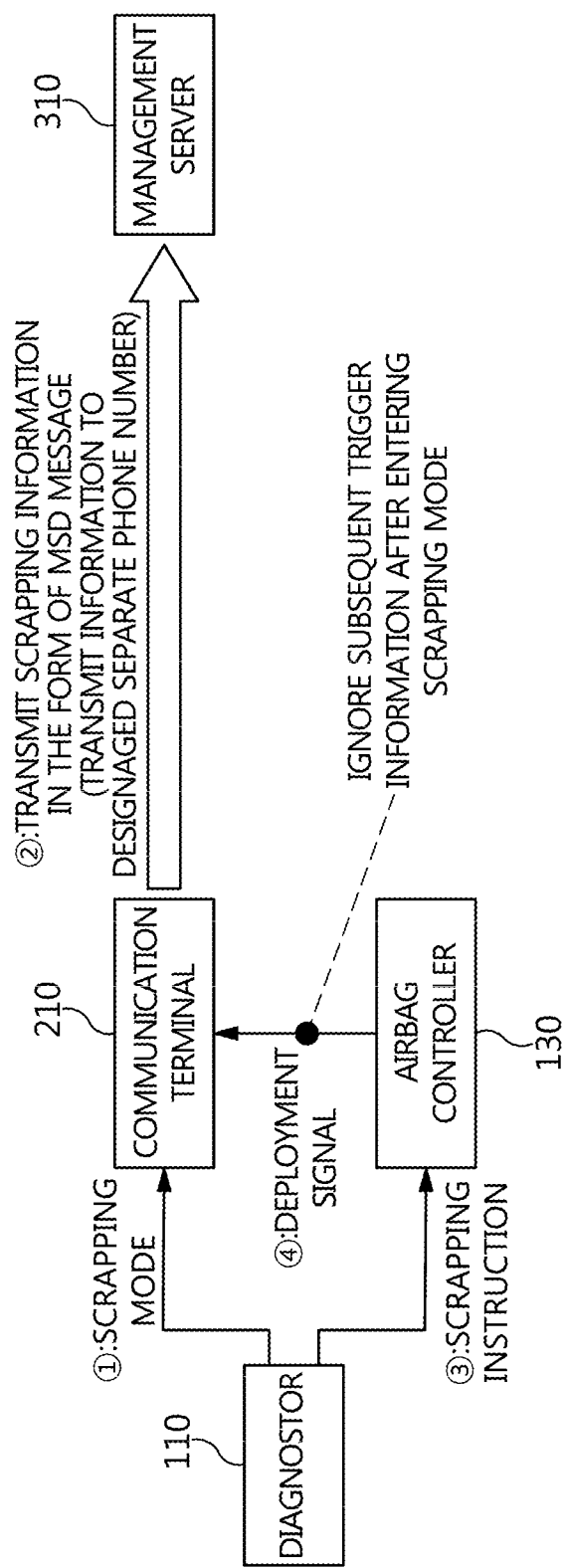
FIG. 3 is an operation conceptual view of the device for verifying the vehicle-scrapping information in one form of the present disclosure.

FIG. 3 is an operation conceptual view of the device for verifying the vehicle-scrapping information in some forms of the present disclosure. Referring to FIG. 3, ① The diagnostor 110 generates the scrapping instruction for entering the scrapping mode. ② The communication terminal 210 transmits the end-of-use information (i.e., the scrapping information) to a management server 310 in the form of a minimum set of data (MSD) message. Of course, for this purpose, the management server 310 has predesignated separate call information. This call information may be a phone number.

③ The diagnostor 110 issues the scrapping instruction to the airbag controller 130. In other words, the scrapping instruction is first transmitted to the communication terminal 210 side, and is transmitted to the airbag controller 130 after the communication terminal 210 transmits the end-of-use information to the management server 310. In accordance with such the scrapping instruction, the airbag controller 130 generates the airbag deployment signal for the airbag 10. Then, ④ the airbag controller 130 transmits the airbag deployment signal to the communication terminal 210. Thereafter, when entering the scrapping mode, the communication terminal 210 ignores all interrupt signals (i.e., trigger information).

The management server 310 includes a microprocessor, a memory for storing a database therein, a network card and the like. Accordingly, the management server performs registration, unregistration of the call information of the communication terminal 210, or the like.

Figure 4:
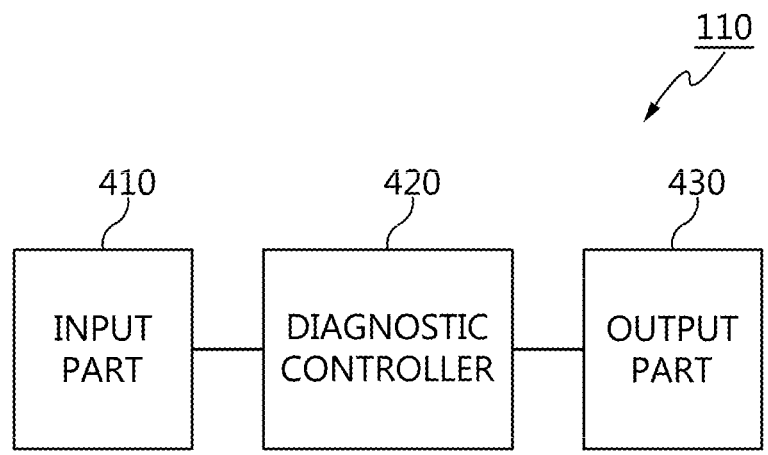
FIG. 4 is a block diagram illustrating a detail configuration of the diagnostor illustrated in FIG. 1.

FIG. 4 is a block diagram illustrating a detail configuration of the diagnostor 110 illustrated in FIG. 1. Referring to FIG. 4, the diagnostor may include an input part 410 configured to receive user's instruction, a diagnostic controller 420 generating the scrapping instruction according to user's input, and an output part 430 outputting the scrapping instruction to the airbag controller 130. A mouse, a keyboard, a touch screen, or the like may be employed as the input part 410. The diagnostic controller 420 is comprised of a microprocessor, circuitry and the like to generate the scrapping instruction. In addition, the output part 430 may be comprised of a communication circuit, a modem, and the like to change the scrapping instruction into a communication signal. The diagnostor 110 may be a separate device or a device installed in a vehicle.

Figure 5:
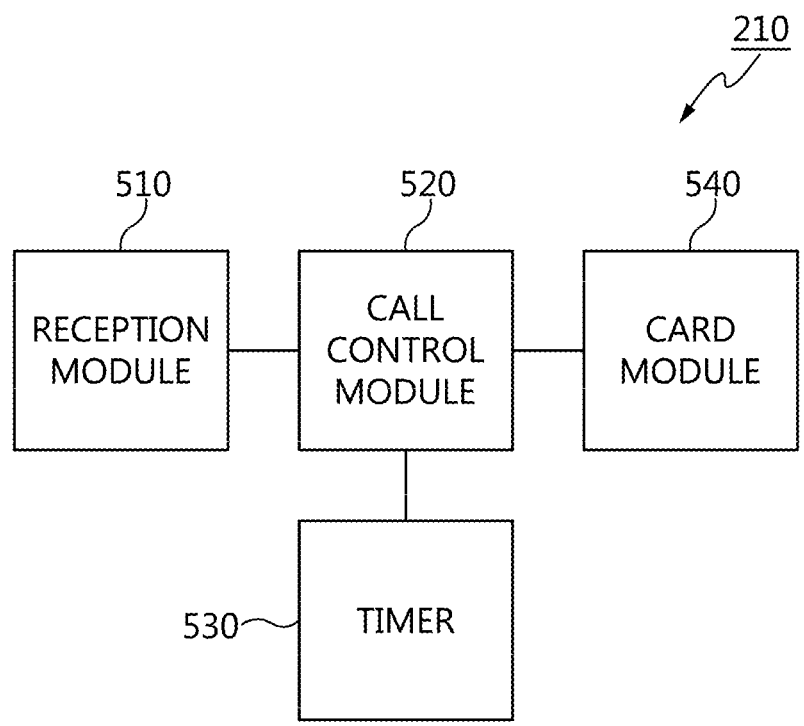
FIG. 5 is a block diagram illustrating a detail configuration of the airbag controller illustrated in FIG. 1.

FIG. 5 is a block diagram illustrating a detail configuration of the airbag controller 130 shown in FIG. 1. Referring to FIG. 5, the airbag controller may include a reception module 510 receiving a signal from the diagnostor 110, a call control module 520 executing a pre-set call scenario according to the received signal to control a call, a timer 530 generating an elapsed time, a card module 540 in which an embedded subscriber identity module (eSIM) is installed, and the like. The reception module 510 and the call control module 520 denote a unit for processing at least one function or operation, and may be implemented in a hardware and/or software.

In hardware implementation, the reception module and the call control module may be implemented by an application specific integrated circuit (ASIC), a digital signal processor (DSP), a programmable logic device (PLD), a field programmable gate array (FPGA), a processor, a controller, a microprocessor, another electronic unit, which are designed for performing the above-described functions, or a combination thereof. In software implementation, the reception module and the call control module may be implemented as a module that performs the above-described functions. The software may be stored in a memory unit and executed by a processor. The memory unit or the processor may employ various means which are well known to those skilled in the art.

Figure 6:
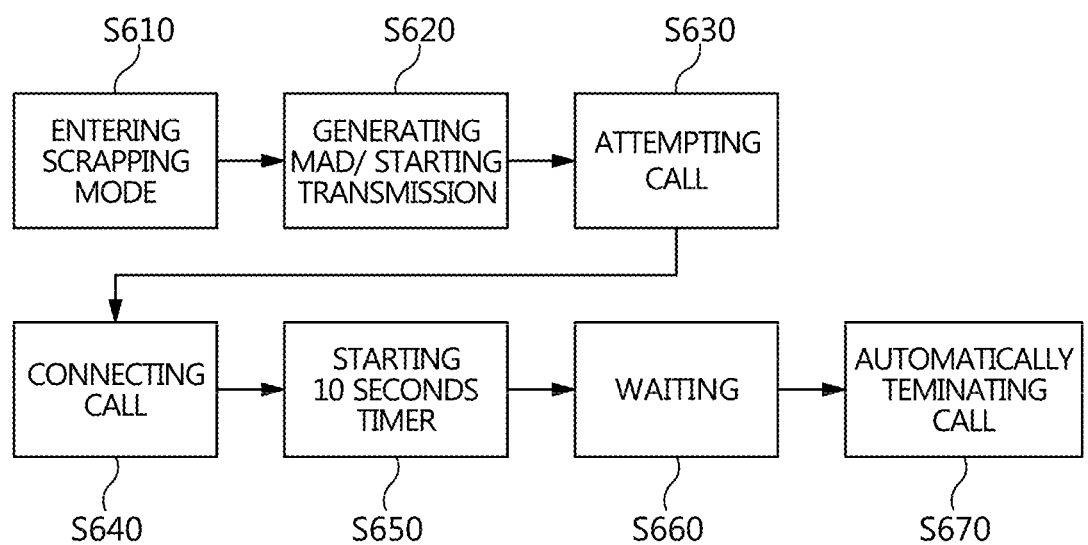
FIG. 6 is a flow chart illustrating a process for verifying the vehicle-scrapping information in one form of the present disclosure.

FIG. 6 is a flow chart illustrating a process for verifying the vehicle-scrapping information in some forms of the present disclosure. Referring to FIG. 6, the communication terminal (210 in FIG. 2) receives the scrapping instruction from the diagnostor 110 and then enters the scrapping mode (Step S610). Then, the communication terminal 210 generates the MSD message and transmits it to the management server 310 (Step S620). In other words, the end-of-use information is configured in the MSD message. That is, the end-of-use information is defined as "1" if there is the scrapping instruction in an additional region of the MSD message and is defined as "0" if there is no scrapping instruction in the additional region of the MSD message. Of course, the vehicle-scrapping information may be included in the MSD message. Vehicle number and the like may be the vehicle-scrapping information.

Thereafter, the communication terminal 210 makes a call attempt to the management server 310 according to the call scenario between the communication terminal and the management server (Step S630). In response to the call attempt, the management server 310 verifies whether the communication terminal is registered, and the management server allows a call connection if it is the registered communication terminal (Step S640).

When the call connection is established, the timer (530 of FIG. 5) immediately starts to operate, and the pre-set elapsed time is checked, which may be regarded as a waiting time (Step S660). When the waiting time is elapsed, the communication terminal 210 automatically terminates the call connection between the communication terminal and the management server 310 (Step S670). Unlike an "ERA mode" which is an initial mode when a vehicle power is supplied, the call operation which differs from a conventional SOS call operation is performed. After a termination of the call scenario, the communication terminal 210 is switched to a communication OFF mode and ignores trigger information which is being input during this process.

Further, the steps of the method or algorithm described in some forms of the present disclosure disclosed herein may be embodied in the form of program instructions, which may be performed via a variety of computer means, and recorded in a computer-readable recording medium. The above computer-readable recording medium may include a program (instruction) code, a data file, a data structure, or the like alone or in combination.

The program (instruction) code recorded in the above-described medium may be those specially designed and configured for the present disclosure or may be those known and available to those skilled in a computer software field. Examples of the computer-readable recording medium may include magnetic media such as a hard disk, a floppy disk, a magnetic tape and the like, optical media such as a CD-ROM, a DVD, Blu-ray and the like, and semiconductor memory devices such as a ROM, a RAM, a flash memory and the like, which are specifically configured to store and execute a program (instruction) code.

Here, an example of the program (instruction) code includes a high-level language code that can be executed by a computer using an interpreter or the like, as well as machine language code such as that produced by a compiler. The above-mentioned hardware device may be configured to be operated as one or more software modules for performing the operations of the present disclosure, and vice versa.

According to the present disclosure, it is possible to inhibit a misuse of the system after an end-of-use of the specific vehicle owner by presenting the technique for terminating the eCall system when the vehicle is scrapped.

In addition, as another effect of the present disclosure, it is possible to inhibit mis-notification of an accident caused by the airbag deployment signal generated when the airbag is scrapped, and thus it is possible to inhibit a rescue center from responding erroneously.

In addition, yet another effect of the present disclosure can be that an operation center can automatically secure an integrated circuit card identifier (ICCID) of the expired embedded subscriber identity module (eSIM) so that revocation of the relevant ICCID can be made possible.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A device for verifying vehicle-scrapping information, comprising:
a communication terminal configured to:
receive, from a diagnostor which is a separate device configured to safely terminate an emergency call (eCall) system at a time of scrapping a vehicle, a scrapping instruction which an airbag is deploying to enter a scrapping mode when the airbag is scrapped;
generate a minimum set of data (MSD) message including end-of-use information;
determine whether the scrapping instruction is included in an additional region of the MSD message;
transmit, to a management server, the end-of-use information based on the scrapping instruction;
make a call attempt to the management server based on a call scenario between the communication terminal and the management server;
in response to the call attempt, transmit, to the management server, a verification request to determine whether the communication terminal is registered;
in response to determining that the communication terminal is registered, establish a call connection with the management server;
in response to determining that a certain amount of time is elapsed, automatically terminate the call connection with the management server; and
in response to the terminated call connection, switch to a communication off mode and ignore all interrupt signals to inhibit mis-notification of an accident caused by an airbag deployment signal; and
an airbag controller configured to:
receive, from the diagnostor, the scrapping instruction;
generating the airbag deployment signal;
transmit, to the communication terminal, the airbag deployment signal; and
in response to the established call connection, control a timer to determine whether the certain amount of time is elapsed.

2. The device for verifying the vehicle-scrapping information of claim 1, wherein the communication terminal is further configured to:
define the end-of-use information as "1" when it is determined that the scrapping instruction is included in the additional region of the MSD message; and
define the end-of-use information as "0" when it is determined that no scrapping instruction is included in the additional region of the MSD message.

3. The device for verifying the vehicle-scrapping information of claim 1, wherein the airbag controller is configured to record relevant items as diagnostic trouble codes (DTC) after generating the airbag deployment signal.

4. The device for verifying the vehicle-scrapping information of claim 1, wherein the airbag controller is configured to connect to the diagnostor via a wired communication or a wireless communication.

5. The device for verifying the vehicle-scrapping information of claim 1, wherein the management server has call information which is predesignated to allow the management server to be connected to the communication terminal.

6. The device for verifying the vehicle-scrapping information of claim 1, wherein the communication terminal has an embedded subscriber identity module (eSIM) mounted therein.

7. A method for verifying vehicle-scrapping information, comprising:
receiving, by a communication terminal, a scrapping instruction which an airbag is deploying from a diagnostor which is a separate device configured to safely terminate an emergency call (eCall) system at a time of scrapping a vehicle to enter a scrapping mode when the airbag is scrapped;

generating, by the communication terminal, a minimum set of data (MSD) message including end-of-use information;
determining, by the communication terminal, whether the scrapping instruction is included in an additional region of the MSD message;
transmitting, by the communication terminal, the end-of-use information based on the scrapping instruction to a management server;
making, by the communication terminal, a call attempt to the management server based on a call scenario between the communication terminal and the management server;
in response to the call attempt, transmitting, by the communication terminal, a verification request to the management server to determine whether the communication terminal is registered;
in response to determining that the communication terminal is registered, establishing, by the communication terminal, a call connection with the management server;
in response to determining that a certain amount of time is elapsed, automatically terminating, by the communication terminal, the call connection with the management server; and
in response to the terminated call connection, switching, by the communication terminal, to a communication off mode and ignore all interrupt signals to inhibit misnotification of an accident caused by an airbag deployment signal;
receiving, by an airbag controller, the scrapping instruction from the diagnostor;
generating, by the airbag controller, the airbag deployment signal;
transmitting, by the airbag controller, the airbag deployment signal to the communication terminal; and
in response to the established call connection, controlling, by the airbag controller, a timer to determine whether the certain amount of time is elapsed.

8. The method for verifying the vehicle-scrapping information of claim 7, wherein the method comprises:
when it is determined that there is the scrapping instruction is included in the additional region of the MSD message, defining the end-of-use information as "1"; and
when it is determined that no scrapping instruction is included in the additional region of the MSD message, defining the end-of-use information as "0".

9. The method for verifying the vehicle-scrapping information of claim 7, wherein the method comprises:
recording, with the airbag controller, relevant items as diagnostic trouble codes (DTC) after generating the airbag deployment signal.

10. The method for verifying the vehicle-scrapping information of claim 7, wherein the method comprises:
connecting the airbag controller to the diagnostor via a wired communication or a wireless communication.

11. The method for verifying the vehicle-scrapping information of claim 7, wherein the management server has call information which is predesignated to allow the management server to be connected to the communication terminal.

12. The method for verifying the vehicle-scrapping information of claim 7, wherein the communication terminal has an embedded subscriber identity module (eSIM) mounted therein.

* * * * *